(12) United States Patent
Bos (10) Patent No.: US 11,298,755 B2
(45) Date of Patent: Apr. 12, 2022

(54) DEVICE FOR SECURELY ATTACHING A DRILLING DEVICE TO A DRILL PLATE INCLUDING AN EXPANDABLE COLLET WITH BALLS

(71) Applicant: ETABLISSEMENTS GEORGES RENAULT, Saint Herblain (FR)

(72) Inventor: Remi Bos, Cornebarrieu (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 282 days.

(21) Appl. No.: 16/709,282

(22) Filed: Dec. 10, 2019

(65) Prior Publication Data
US 2020/0180046 A1 Jun. 11, 2020

(30) Foreign Application Priority Data
Dec. 11, 2018 (FR) ........................................ 1872722

(51) Int. Cl.
*B23B 49/02* (2006.01)
*B23B 41/00* (2006.01)

(52) U.S. Cl.
CPC ............ *B23B 49/023* (2013.01); *B23B 41/00* (2013.01); *B23B 49/02* (2013.01); *B23B 2215/04* (2013.01)

(58) Field of Classification Search
CPC . B23B 49/023; B23B 2215/04; B23B 47/287; B23B 47/28; B23B 41/00; B23B 49/02; Y10T 408/56245
See application file for complete search history.

(56) References Cited

U.S. PATENT DOCUMENTS

| | | | | |
|---|---|---|---|---|
| 2,839,953 | A * | 6/1958 | Hanger | B23B 49/00 408/72 R |
| 2,935,905 | A * | 5/1960 | Winslow | B23B 49/02 408/112 |
| 5,395,187 | A | 3/1995 | Slesinski et al. | |
| 5,482,411 | A | 1/1996 | McGlasson | |
| 5,628,592 | A * | 5/1997 | Ringer | B23B 49/02 408/110 |
| 6,012,877 | A * | 1/2000 | McCowin | B23B 49/02 279/2.04 |
| 8,790,050 | B2 * | 7/2014 | Marguet | B21J 15/142 408/19 |
| 10,118,234 | B2 * | 11/2018 | Bainvel | B23B 49/023 |
| 2004/0223821 | A1 | 11/2004 | Blankenship et al. | |

(Continued)

FOREIGN PATENT DOCUMENTS

| | | | | |
|---|---|---|---|---|
| FR | 2562179 A1 * | 10/1985 | ............ | B25B 5/061 |
| GB | 2486821 A * | 6/2012 | ............ | B23B 49/02 |
| WO | 2008133586 A1 | 11/2008 | | |

OTHER PUBLICATIONS

English translation of the Written Opinion of the French Searching Authority dated Aug. 30, 2019 for corresponding French Application No. FR 1872722, filed Dec. 11, 2018.

(Continued)

*Primary Examiner* — Eric A. Gates
*Assistant Examiner* — Paul M Janeski
(74) *Attorney, Agent, or Firm* — David D. Brush; Westman, Champlin & Koehler, P.A.

(57) ABSTRACT

A device for securely attaching a drilling device to a drill plate provided with a plurality of positioning bores. The attachment to the drill plate including an expandable collet with balls.

18 Claims, 9 Drawing Sheets

(56) References Cited

U.S. PATENT DOCUMENTS

2010/0040426 A1* 2/2010 Pettersson ........... B23B 31/1071
408/115 B
2012/0328382 A1* 12/2012 Ihara ..................... B23B 49/023
408/240

OTHER PUBLICATIONS

Search Report dated Aug. 30, 2019 for corresponding French Application No. FR 1872722, filed Dec. 11, 2018.
Written Opinion of the French Searching Authority dated Aug. 30, 2019 for corresponding French Application No. FR 1872722, filed Dec. 11, 2018.

* cited by examiner

DEVICE FOR SECURELY ATTACHING A DRILLING DEVICE TO A DRILL PLATE INCLUDING AN EXPANDABLE COLLET WITH BALLS

1. FIELD OF THE INVENTION

The field of the invention is that of the designing and manufacture of devices for securely attaching implemented to securely attach drilling devices to drill plates.

2. PRIOR ART

In aeronautics, drilling operations are commonly carried out on aircraft structures during the manufacture of aircraft.

The location of the drill holes to be made are generally defined by means of drill plates.

A drill plate takes the form of a plate traversed by a plurality of positioning bores.

Such a plate or screen is intended for being placed securely in proximity to an element to be drilled or workpiece, in a pre-determined particular position so that the position of the positioning bores corresponds to locations where the drill-holes have to be made in the workpiece.

Once the drill plate is thus positioned, a drilling device is affixed at one of the positioning bores and then a hole is made in the workpiece. The drilling device is then securely attached to another bore of the plate to make another hole in the workpiece The drilling device is thus successively secured to different positioning bores of the plate so as to make a plurality of drill-holes in the workpiece.

The drilling devices generally implemented are automatic forward-feed drilling devices (comprising a single motor to drive a drilling spindle in translation and in rotation along one and the same axis) or drilling devices with a controlled cutting parameters (comprising a forward-feed motor and a rotation motor to drive a drilling spindle in translation and in rotation along one and same axis).

The secure attachment of a drilling device to the plate is done by means of a device for securely attaching comprising an expandable collet.

Such an expandable collet comprises:
a cylindrical expandable ring traversed by an internal conical bore made along a longitudinal axis of the expandable ring;
an expansion cone housed inside the conical bore of the expandable ring, the external peripheral outline of which is complementary to the conical bore;
means for the driving in translation of the expansion cone within the conical bore along the longitudinal axis between at least:
a releasing position in which the cone is shifted to the largest-diameter side in the conical bore of the expandable ring so much so that this ring is in a relaxed state in which its external diameter is smaller than that of the positioning bores of the plate so that it can be introduced therein or extracted therefrom;
a locking position in which the cone is shifted to the smallest-diameter side of the conical bore of the expandable ring so much so that this ring is situated in an expanded state in which its external diameter is increased so as to keep the drilling device securely attached to the drilling gate by friction of the expandable ring against the internal walls of the positioning bore in which it is situated.

The shifting in translation of the expansion cone relative to the expandable ring is obtained by a cylinder assembly, generally pneumatic. This cylinder assembly is disposed so as to be perpendicular to the expansion cone and so as to drive it by means of a motion conversion device such as rollers running in a slideway that is inclined relative to the axis of the cone and of the cylinder assembly or again a device such as a spreader.

The axial force applied to the expansion cone generates contact pressure between the expandable collet and the positioning bore in which it is housed in a locking position. This contact pressure and the associated friction must be sufficient to counter the reaction torque and the thrust forces along the drilling axis transmitted to the drill during a drilling operation and ensures that the drilling device is accurately attached to the plate. The robustness of this secure attachment is therefore dependent on the axial force generated by the cylinder assembly.

In the event of an insufficient secure attachment, the drilling device can slide relative to the plate during a drilling operation. Such a sliding process can have repercussions on the quality of the drilling, especially its depth, if the drilling device retreats away from the plate during a drilling operation. This is not acceptable since the geometrical tolerances laid down in the aeronautics sector are often very low.

The risk that the drilling device may slide relative to the plate during a drilling operation is all the greater when the material to be drilled is hard, the cutting tool is worn out (in both cases, the thrust and the torque transmitted to the drill during the drilling operation are greater) and the drilling is done with lubrication.

To prevent such a shifting of the drilling device from occurring, there are known ways of increasing the size of the cylinder assembly or using greater pressure, which can entail drawbacks in terms of available space or mechanical fatigue of the components.

Another way to prevent the slipping or sliding of the drilling device relative to the drill plate is to implement complementary mechanical holding systems comprising a quarter-turn bayonet system securely attached to the drilling device, designed to cooperate with shoulder screws securely attached to the drill plate.

Such a system has the drawback of being bulky and of not being compatible with a small distance between the drill plate holes.

The devices for securely attaching for securely attaching drilling devices to drill plates can be further improved, especially in order to:
limit the risk of having the drilling device slide relative to the drill plate during a drilling operation, as well as the drawbacks inherent in such sliding;
reduce the forces that have to be developed to maintain the device for securely attaching securely attached to a drill plate.

3. SUMMARY

An aspect of the present disclosure relates to a device for securely attaching a drilling device to a drill plate traversed by a plurality of positioning bores, said device for securely attaching comprising:
a body;
first means for securely attaching said body to said drilling device;
second means for securely attaching said body to said drilling plate, said second means for securely attaching comprising an expandable collet, said expandable collet comprising:

an expandable ring traversed by a conical bore made along a longitudinal axis of said expandable ring;

an expansion cone housed within said conical bore of said expandable ring, the external peripheral outline of said expansion cone being complementary to said conical bore;

means for the driving in translation of said expansion cone within said conical bore along said longitudinal axis between at least:

a releasing position in which said cone is shifted to the largest-diameter side of said conical bore of said expandable ring so much so that said expandable ring is situated in a relaxed state in which its external diameter is smaller than the diameter of said positioning bores of said plate so that it can be inserted therein or extracted therefrom;

a locking position in which this said cone is shifted to the smallest-diameter side of said conical bore of said expandable ring so much so that said expandable ring (120) is situated in an expanded state in which its external diameter is increased so as to keep said device for securely attaching securely attached to said drill plate by friction of said expandable ring against the internal walls of one of said positioning bores of said plate.

According to an exemplary embodiment, said expandable collet furthermore comprises locking balls each housed in a hole made in said expandable ring, said expansion cone acting on said locking balls to place them in:

an unblocking position, taken when said cone is situated in its releasing position, in which said locking balls do not form protrusion on the external peripheral surface of said expandable ring;

a blocking position, taken when said cone is situated in its locking position, in which said locking balls form protrusion on the external peripheral surface of said expandable ring so that it can get housed in a peripheral blocking housing securely attached to said positioning bores of said plate.

Thus, an exemplary embodiment consists in implementing an expandable collet with balls to provide for the secure attachment of a drilling device to a drill plate.

The use of balls, which get housed in a peripheral housing securely attached to a positioning bore of a drill plate simply but efficiently blocks the drilling device in translation relative to the plate. Thus, the drilling device cannot move in translation along the drilling axis relative to the drill plate, and in particular it is cannot retreat. Thus, compliance is ensured with the low geometrical tolerances that are generally laid down, especially as regards the repeatability of the depths of successive drill-holes.

The technique according to an exemplary embodiment thus makes it possible, by the implementing of a compact and simple solution, to make high quality drill-holes.

According to a possible variant, said balls are housed in longitudinal grooves made on the surface of said expansion cone.

This ensures appropriate guidance of the balls towards the holes of the expandable ring.

According to one possible variant, each of said grooves comprises a first stage and a second stage separated by an inclined ramp, the bottom of said first stage being closer to the longitudinal axis of said expansion cone than the bottom of said second stage, said balls being situated against said first stage in said unblocking position and against said second stage in said blocking position.

This ensures that the locking balls are kept in a blocking position and prevents an untimely return to an unblocking position.

According to one possible variant, said grooves are not through grooves.

This prevents the introduction of dirt between the expansion cone and the expandable ring and thus ensures efficient operation of the expandable collet with balls.

According to one possible variant, said positioning bores are made in said drill plate.

According to one possible variant, a device for securely attaching according to an exemplary embodiment includes guidance rings intended to be securely attached to said drill plate and traversed by said positioning bores.

This preserves the plate from possible localized deformations of the surface of the positioning bores under the effect of forces caused by the locking of the expandable collet.

According to one possible variant, said peripheral blocking housings are made in said plate or in said guidance rings.

According to one possible variant, said body comprises a stop that is intended to abut against a surface of said drill plate or against a surface of said guidance rings oriented towards said device for securely attaching.

This ensures a repeatable positioning of the body of the device for securely attaching relative to the plate and thus improves the quality of the drill-holes made.

According to one possible variant, said guidance ring comprises a shoulder with a shape complementary to a housing made in said positioning bores of said plate.

In this case, said shoulder is preferably made to the side of said plate that is opposite to the side oriented towards said device for securely attaching.

According to one possible variant, the passage of said cone from its releasing position to its locking position is done in the direction of the surface of said drill plate oriented towards said device for securely attaching, or vice versa.

According to one possible variant, said means for driving in translation of said expansion cone comprise a cylinder assembly, said cylinder assembly comprising a cylinder made within said body and a piston mounted so as to be mobile in translation within said cylinder along the axis of translation of said expansion cone, said expansion cone being securely attached in translation to said piston.

The implementing of such a coaxial cylinder assembly has the advantage of giving a device for securely attaching that is appreciably more compact than one implementing a perpendicular cylinder assembly.

According to one possible variant, said cylinder assembly is a double-action cylinder.

This enables a more efficient control of the locking and unlocking of the expandable collet with balls.

According to one possible variant, said cylinder of said cylinder assembly comprises a locking chamber placed on one side of the piston and intended to be powered to shift said expansion cone into its locking position and a releasing chamber placed on the other side of the piston and intended to be powered to shift said expansion cone into its releasing position, the surface area of the face of the piston situated in said releasing chamber being greater than the surface area of the face of said piston situated in said locking chamber.

This makes it possible, during the unlocking of the expandable collet, to counter the gripping effect of the expansion cone in the expandable ring.

According to one possible variant, a device according to an exemplary embodiment comprises means of regulation of said means for driving in translation of said expansion cone, said regulation means being configured so that the speed of movement in translation given to said expansion cone by said means for driving is greater during its passage from said releasing position to said locking position than it is during its passage from said locking position to said releasing position.

This ensures that the cutting tool has come out of the drill plate before the detachment device has been able to get detached from the drill plate. Thus, the breakage of the cutting tool during the detachment of the drilling device is prevented.

According to one possible variant, a device for securely attaching according to an exemplary embodiment is crossed from one side to the other by a drill jig bushing.

4. DESCRIPTION OF THE FIGURES

Other features and advantages shall appear from the following description of particular embodiments given by way of a simple illustrative and non-exhaustive example and from the appended drawings of which.

5. DESCRIPTION OF PARTICULAR EMBODIMENTS 5.1. Architecture

Referring to FIGS. 1 to 9, we present one example of an embodiment of a device for securely attaching a drilling device to a drill plate comprising an expandable collet with balls.

Such a device for securely attaching can be implemented to ensure the secure attachment of any type of drilling device (or drill) to a drill plate, such devices comprising especially but not exclusively drills with controlled cutting parameters and automatic forward-feed drills.

Figure 1:
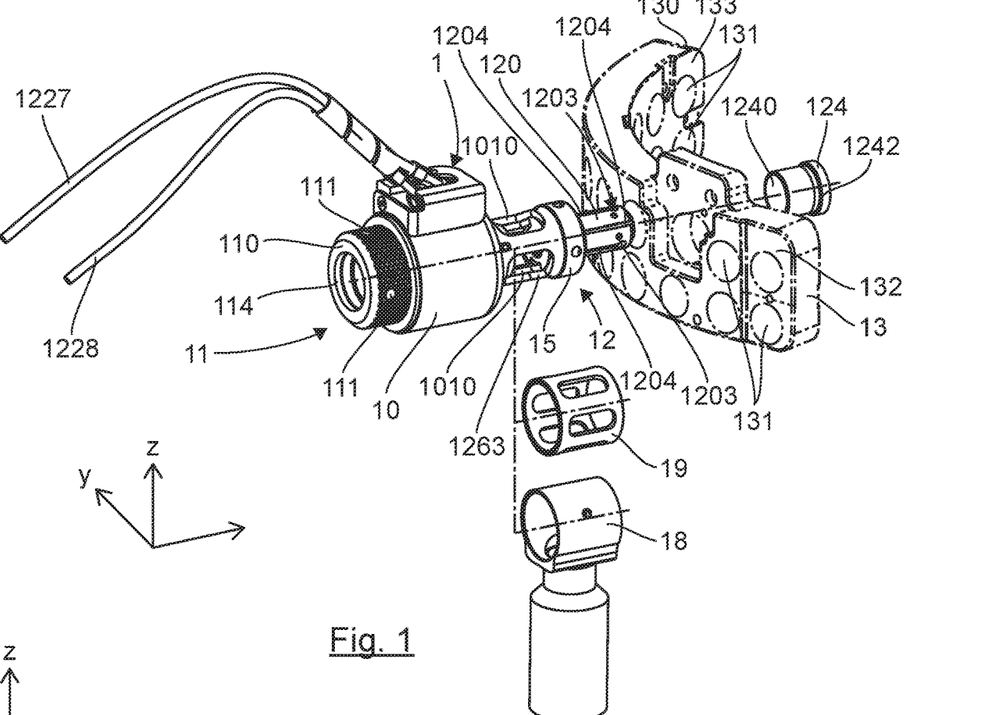
FIG. 1 illustrates a three-quarter or perspective view of a device for securely attaching according to an exemplary embodiment.
Figure 2:
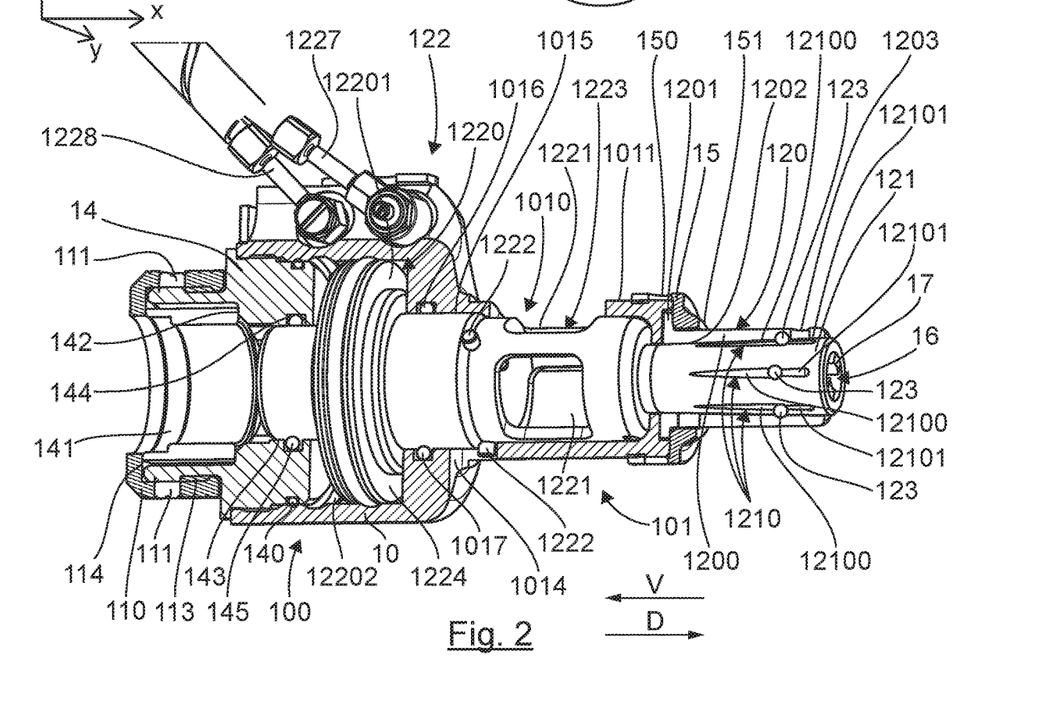
FIG. 2 illustrates a three-quarter or perspective view and a cross-section view of the device of FIG. 1.
Figure 3:
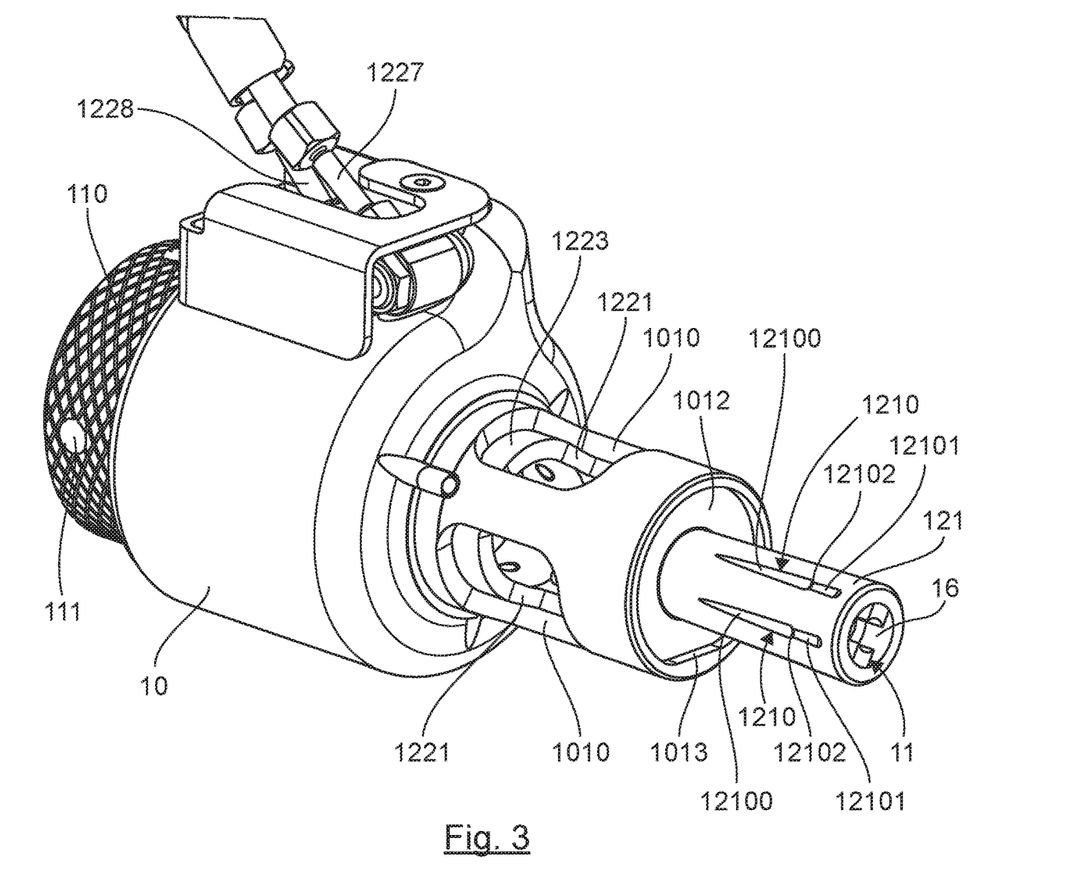
FIG. 3 illustrates a three-quarter or perspective view and a cross-section view of the device of FIG. 2.

Referring to FIG. 1, such a device securely attaching 1 comprises a body 10 comprising, at a first extremity, first means 11 of secure attachment to a drilling device and, at its opposite extremity, second means of secure attachment 12 to a drill plate 13.

As is shown, drill plate 13 classically comprises a plate 130 traversed by a plurality of positioning bores 131. Such a plate 130 can be flat, curved or have any other shape adapted to the drilling of the workpiece. It has a surface 132 oriented to the drilling device side, i.e. to the secure attachment side, and then an opposite surface 133 oriented toward the side corresponding to a workpiece.

The first means 11 for securely attaching the device to a drill comprise a knurled nut 110 capable of being screwed into a tapped portion 113 of the body 10 or more specifically a plug 14 which will be described in greater detail here below. The nut 110 can be tightened through a pin wrench that fits into the holes 111.

The knurled nut 110 has a shoulder 114.

The second means of secure attachment 12 for securely attaching the device to a drill plate comprise an expandable collet with balls that shall be described in greater detail here below.

The body 10 comprises a first portion 100 with large diameter extended by a second portion 101 with a smaller diameter.

The first portion 100 is traversed by a bore 1220. This bore 1220 is open on the exterior of its front extremity and closed by means of a plug 14 screwed to the body 10.

The plug 14 bears an O-ring 140 to carry out a hermetic sealing of the bore 1220.

The plug 14 is capable of housing an internal ring 141 that is held therein between a shoulder 142 made inside the plug 14 and a shoulder 114 of the knurled bolt 110. This internal ring 141 is designed to be securely attached to the extremity of the drilling device that is to be securely attached to the device for securely attaching.

The second portion 101 is traversed laterally by apertures 1010 which enable the removal of chips during the drilling operation.

The rear extremity of the second portion 101 has a threaded part 1011 to which a nut 15 with transversal holes 150 is screwed in order to enable the insertion of a pin wrench in order to tighten the nut 15 on to the body 10.

The nut 15 has a stop 151 defining the support surface that is intended to abut against the surface 132 of the plate 13 oriented towards the device for securely attaching when this device is securely attached to the gate 13.

The expandable collet with balls comprises especially:
an expandable ring 120;
an expansion cone 121 housed within the expandable ring 120'
means for the driving in translation 122 of the expansion cone 121 within the expansion ring 120;
locking balls 123;
a guiding ring 124.

The expandable ring 120 comprises a portion 1200 with an essentially cylindrical external outline extended at one of its extremities by a shoulder 1201 having a flat portion (not shown). This shoulder 1201 is housed within a bore 1012 made at the rear extremity of the second portion 101 of the body and having a flat portion 1013 with a shape complementary to that of the flat portion of the expandable ring 120. The expandable ring 120 is securely attached to the body 10 by means of the nut 15 which blocks it in translation relative to the body 10. The expandable ring 120 is blocked in rotation relative to the body 10 by the flat portions.

Longitudinal slots 1204 are made longitudinally on the periphery of the portion 1200 of the expandable ring 120 so as to enable the expandable ring to expand and shrink as shall be seen more clearly here below.

The expandable ring 120 is traversed by a conical bore 1202 (or more exactly truncated conical bore) made along a longitudinal axis of the expandable ring. The angle of the bore 1202 is such that the conical bore 1202 has a small-diameter extremity on the body 10 side and an opposite extremity of greater diameter.

The rear extremity of the expandable ring 120 is traversed by radial holes 1203 made along axes perpendicular to the longitudinal axis of the expandable ring 120 and distributed uniformly around this longitudinal axis.

The conical bore 1202 of the expandable ring 120 houses the expansion cone 121. The expansion cone 121 has an external peripheral outline complementary to the internal peripheral outline of the conical bore 1202.

The expansion cone 121 is mounted so as to be mobile in translation within the conical bore 1202 along the longitudinal axis of this bore.

Longitudinal grooves 1210 are made on the surface of the expansion cone 121.

Figure 4:
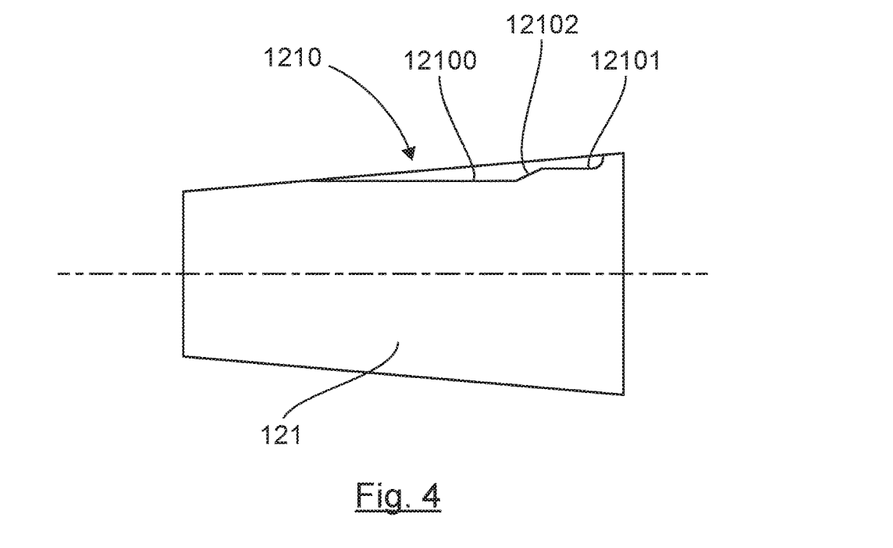
FIG. 4 illustrates a cross-section view of an expansion cone of a device according to an exemplary embodiment.

As can be seen in FIG. 4, these grooves 1210 are staged. They each include a first stage 12100 and a second stage 12101 separated by a tilted ramp 12102. The bottom of each stage extends essentially in parallel to the longitudinal axis of the expansion cone 121. The bottom of the previous stage 12100 is closer to the longitudinal axis of the expansion cone than the bottom of the second stage 12101.

The grooves 1210 are preferably not through-grooves, i.e. they are not open to the exterior at the rear extremity of the expansion cone 121.

Each groove 1210 houses a locking ball 123.

Figure 11:
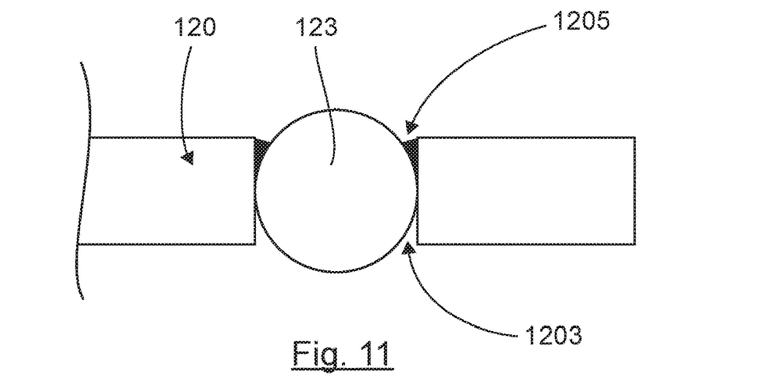
FIG. 11 illustrates the holding of a locking ball in a hole of an expandable ring.

The grooves 1210 are aligned with the orifices 1203 to enable each ball 123 to pass through an orifice 1203. The external diameter of each orifice 1203 is slightly reduced to prevent the ball 123 that is housed therein from completely coming out. To this end, the external diameter of each hole 1203 can for example have a hardened portion 1205 forming a protrusion within the orifice as shown in FIG. 11. Another solution could of course be implemented. This diameter is chosen to enable the ball 123 that is housed therein to protrude out of the external surface of the expandable ring 120.

The expansion cone 121 is securely attached to the extremity of the hollow rod 1223 of a cylinder assembly used to shift the expansion cone 121 in translation within the conical bore 1202.

The rod 1223 is traversed by peripheral apertures 1221 used to discharge chips during a drilling operation. These apertures 1221 extend so as to be facing the apertures 1010 made in the body 10.

The longitudinal axis of the rod 1223 of the cylinder assembly extends coaxially with the drill jig bushing.

The rod 1223 carries transversal pins 1222 each of which is housed in a longitudinal groove 1014 made to this effect in the body 10. The pins 1222 and the grooves 1014 are used to block the rod 1223 in rotation relative to the body 10 and to allow the translation of the rod 1223 in the body 10 along its longitudinal axis.

The rod 1223 carries a piston 1224 housed in the bore 1220. It extends on one side of the piston 122 in a bore 1015 that is made in the body 10 and leads into the bore 1220. It extends on the other side of the piston 1224 into a bore 143 made in the plug 14.

The bores 1015 and 143 each have a peripheral groove 1016, 144 housing an O-ring 1017, 145 used to ensure, with the seal 140, the tight sealing of the bore 1220 which constitutes a cylinder of a cylinder assembly within which the piston 1224 is mounted so as to be mobile in translation.

The piston 1224 demarcates, within the piston 1220, a locking chamber 12201 and a releasing chamber 12202.

The surface area of the front side of the piston situated in the unlocking chamber is greater than the surface area of the front side of said piston situated in said locking chamber.

This makes it possible, during the unlocking of the expandable collet, to counter the effect of gripping of the expansion cone in the expandable ring.

The body 10 is traversed by a locking channel 1225 and by a releasing channel 1226 leading respectively into the locking chamber 12201 and into the releasing chamber 12202 and enabling these elements to be supplied with pressurized fluid.

The locking channel 1225 and the releasing channel 1226 are respectively connected to a locking conduit 1227 and a releasing conduit 1228 intended to be connected with means for the supply of pressurized fluid.

The guidance ring 124 is traversed by an internal bore 1240 within which there is a peripheral internal blocking housing 1241 that takes the form of a neck. It has an external cylindrical outline extended by a shoulder 1242.

The guidance ring 124 is to be inserted within a positioning bore 131 of the drill plate 13. To this end, each positioning bore 131 comprises two internal bored portions 1310, 1311 having different diameters, at the interface of which a shoulder 1312 is formed. The shoulder 1312 is formed on the drill plate 13 side situated opposite the side against which the stop 151 is meant to abut. The guiding ring 124 thus presents an external shape complementary to the internal shape of the positioning bore 131.

The expansion cone 121 is mounted so as to be mobile in translation within the conical bore 1202 of the expandable ring 120 along its longitudinal axis between at least:

a releasing position in which the cone 121 is shifted to the largest-diameter side of the conical bore 1202 of the expandable ring 121 so much so that the expandable ring 120 is in a relaxed state in which its external diameter is smaller than that of the internal bores 1240 of the guidance rings 124, if they are implemented, or of the positioning bores 131 of the drill plate 13 if they are not, so that they can be introduced therein or be extracted therefrom;

a locking position in which the cone 121 is shifted to the smallest-diameter side of the conical bore 1202 of the expandable ring 120 so much so that this ring is situated in an expanded state in which its external diameter is increased so as to keep the device for securely attaching securely attached to the drill plate 13 by friction of the expandable ring 20 against the internal walls of the internal bore 1240 of the guidance ring 124 in which it is situated when the guidance rings 124 are implemented, or against the internal walls of the positioning bore 131 of the plate 13 within which it is situated if not.

When a guidance ring 124 is implemented, its internal bore forms a positioning bore.

Thus, whether a guidance ring 124 is implemented or not, the expandable ring 120 is intended to be housed in a positioning bore (the positioning bore 131 of the plate or the internal bore 1240 of the guidance ring 124) securely attached to the drill plate 13.

Naturally, the diameter of the positioning bore, whether it is made in a guidance ring or directly in the plate will be determined as a function of a capacity of the expandable ring to expand.

The cylinder assembly is used to shift the piston 1224 and the cone 121, securely attached to its rod 1223, from one of its positions to the other.

The expansion cone 121 acts on the locking balls 123 in order to place them in:

- an unblocking position, taken when the cone 121 is situated in its releasing position, in which they do not protrude from the external peripheral surface of the expansion ring 120;
- a blocking position, taken when the cone 121 is situated in its locking position, in which they form protrusion on the external peripheral surface of the expansion ring 120 so as to be able to get housed in the peripheral blocking housing 1241 that is formed in the guidance ring 124 and is securely attached to the positioning bores 131 in which it is housed (or when the guidance rings 124 are not implemented, in a peripheral blocking housing directly made in the positioning bores 131.

The balls 123 are situated against the first stage 12100 of the corresponding groove 1210 in the unblocking position and against the second stage 12101 in the blocking position.

The device for securely attaching comprises means of regulation of the means for driving in translation the expansion cone, i.e. the cylinder assembly. These means of regulation are configured so that the speed of movement in its translation communicated to the expansion cone by the cylinder assembly is smaller during its passage from the releasing position to the blocking position than the speed during its passage from the blocking position to its releasing position.

The device for securely attaching is traversed from one side to the other by a drill jig bushing 16 that enables the shifting in rotation and in translation of a pin and of the cutting tool securely attached to its extremity during a drilling operation.

A chip or shavings breaker 17 is placed at the rear extremity of the drill jig bushing 16.

5.2. Operation

The working of a device for securely attaching according to an exemplary embodiment shall now be described.

A device for securely attaching 1 according to an exemplary embodiment is a first of all securely attached to the extremity of a drilling device.

To this end, a knurled nut 110 is threaded on to the extremity of the casing of the drilling device and then a ring 141 is securely attached to the extremity of the casing of the drilling device so as to be immobile relative to this drilling device. It can for example be force-fitted and/or glued to the extremity of the drilling device. Thus, the knurled nut 110 is kept securely attached to the drilling device by the ring 141. This nut is mobile in rotation relative to the casing of the drilling device, as well as in translation until it comes to a position of abutting against the ring 141.

The body 10 of the device for securely attaching is brought closer to the extremity of the drilling device so as to introduce the ring 141 until it abuts the shoulder 142 of the plug 14. Then, the knurled nut 110 is screwed onto the threaded portion 113 of a complementary shape provided for this purpose on the plug 14 of the device for securely attaching until the ring 141 is compressed between the shoulder 142 of the plug 14 and the shoulder 114 of the knurled nut 110. The device for securely attaching is then secured to the drilling device in such a way that these two elements are immobilized relative to one another.

Figure 12:
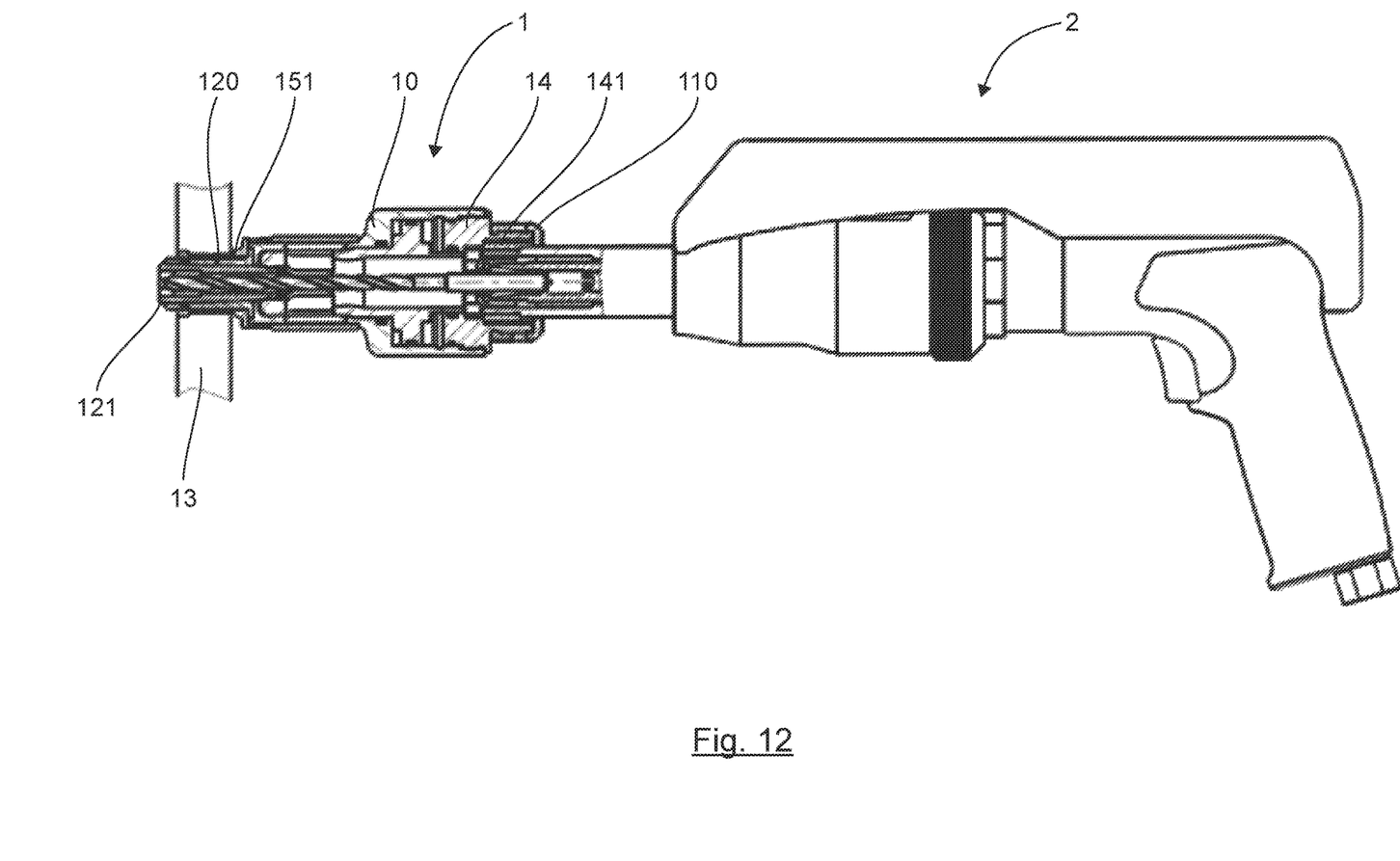
FIG. 12 illustrates a device for securely attaching according to an exemplary embodiment, fixed to the extremity of a drilling device.

FIG. 12 illustrates a device for securely attaching 1 affixed to the extremity of a drilling tool 2 represented partially and schematically.

The pin of the drilling device, as well as possibly the cutting tool which could henceforth be secured thereto, then extend in the longitudinal axis of the device for securely attaching, if necessary partly within the drill jig bushing 16.

The locking conduit 1227 and releasing conduit 1228 are then connected to the pressurized fluid supply network of the drilling device, supplying especially fluids such as compressed air.

Figure 5:
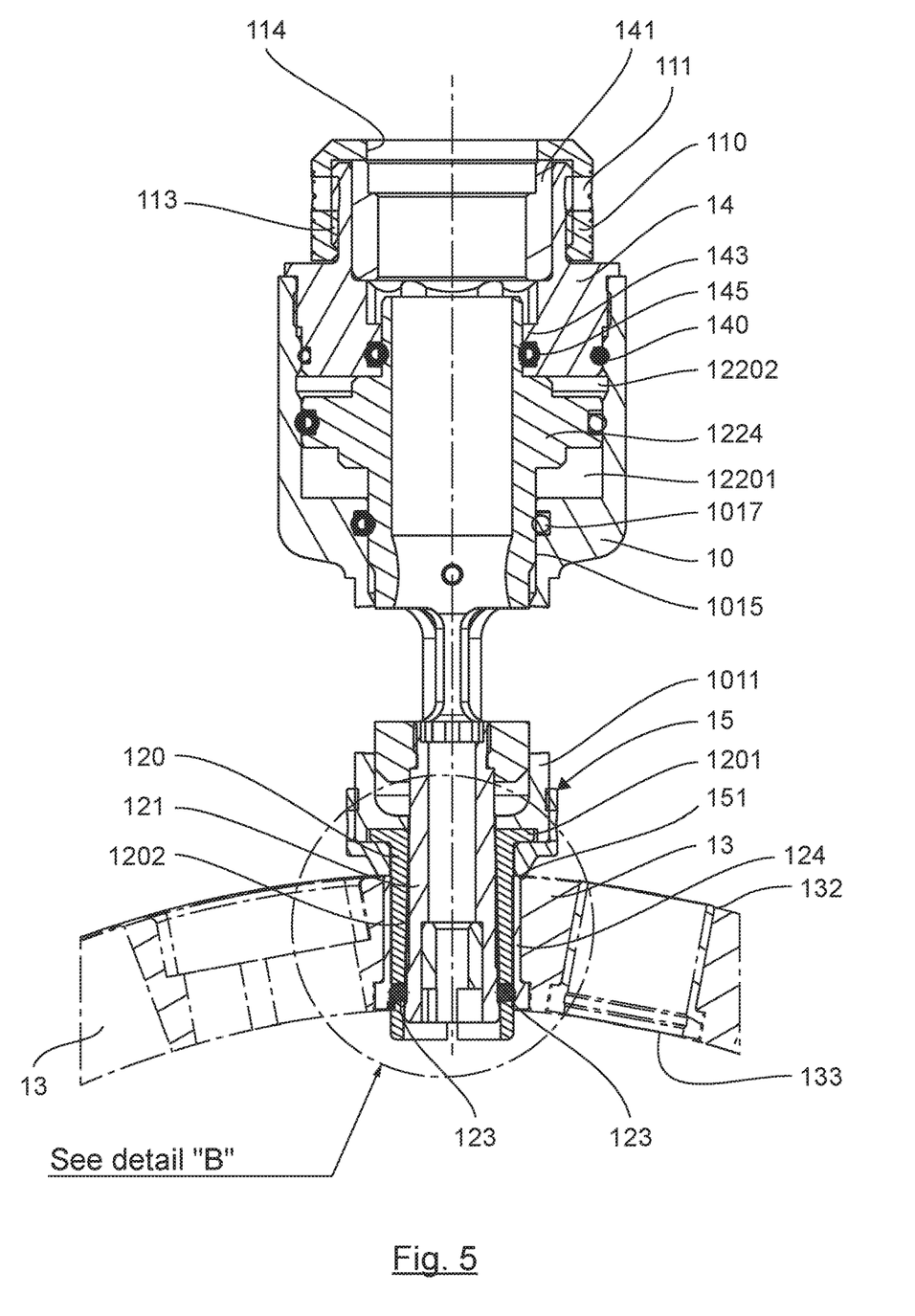
FIG. 5 illustrates a cross-section view of a device according to an exemplary embodiment, cooperating with a drill plate, of which the expansion cone is in a releasing position, the locking balls are in a unblocking position and the expandable ring is in a relaxed state.
Figure 6:
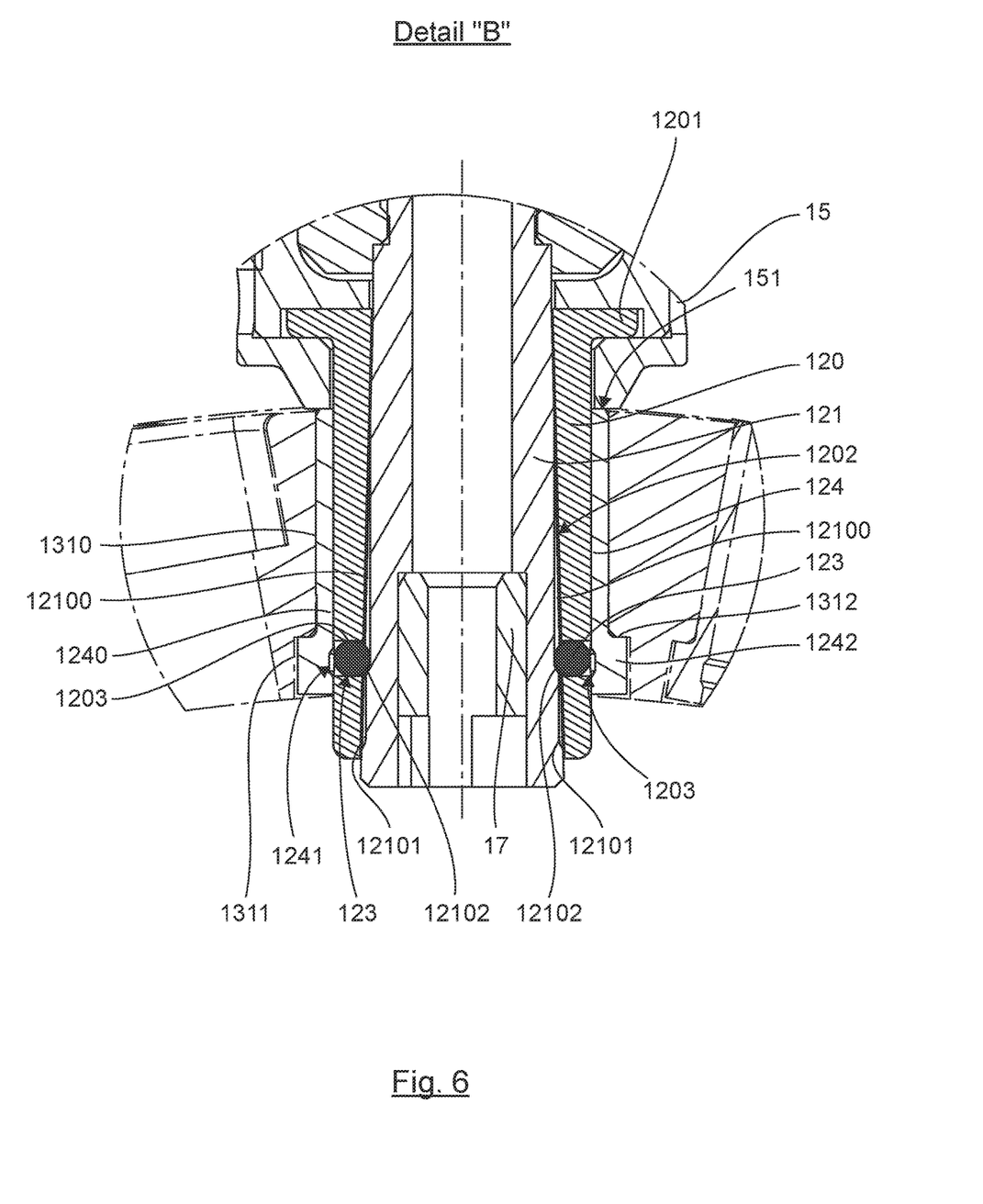
FIG. 6 illustrates a detail from FIG. 5.
Figure 7:
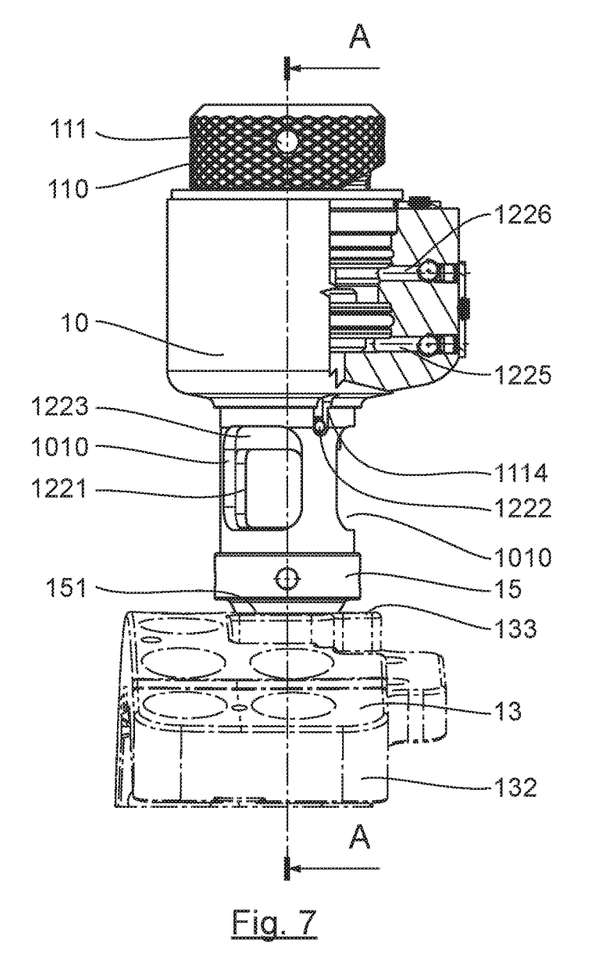
FIG. 7 illustrates a view in partial section of a device of FIG. 5.

The cylinder assembly is then driven so as to place the expansion cone 121 in its releasing position, the locking balls 123 in their unblocking position and the expandable ring 120 in its released state if they are not in this position/state (FIGS. 5 and 6).

To this end, the pressurized fluid is introduced into the releasing chamber 12202 via the releasing conduit 1228.

Under the effect of pressure in the releasing chamber 12202, the piston 1224 get translated into the cylinder 1220 along the longitudinal axis of the piston towards the extremity of the device for securely attaching 1 intended to be securely attached to a drill plate (cf. arrow D).

The rod 1223 of the piston follows the shifting in translation of the piston 1224 so much so that the expansion cone 121 gets translated relative to the expandable ring 120 so as to get positioned in the releasing position in which its large-diameter extremity is distant from the large-diameter extremity of the conical bore 1202 of the expandable ring 120. The expansion cone 121 thus does not act on the expandable ring 120. The expandable ring 120 is then in its released state in which its external diameter is smaller than the internal diameter of the positioning bores 131 of the drill plate 13, or the internal bores 1240 of the guiding rings 124 when they are implemented.

During the movement of the expansion cone 121 towards its releasing position, the locking balls 123 roll on the surface of the expansion cone 121 in their respective grooves 1210 firstly against the second stage 12101 and then against the inclined ramp 12102, to come into contact with the first stage 12100.

During this movement, the locking balls 123 move freely in translation within radial holes 1203 along their longitudinal axis, until they get placed in their unblocking position in which they do not form protrusions on the surface of the expandable ring 120.

The guiding rings 124 are, if necessary, introduced by force into the positioning bores 131 of the drill plate 13, from the face 133 of the plate oriented towards the workpiece side, until their shoulder 1242 comes abuts against the shoulder 1312 of the corresponding positioning bore 131.

The extremity of each positioning ring 124 oriented on the surface 132 side of the plate against which the stop 151 is intended to abut, then forms a slight protrusion of a few tens of millimeters on this surface.

The drilling device and the device for securely attaching that is affixed therein are then shifted so as to introduce the expandable ring 120 into the internal bore 1240 of the guiding ring 124 of the corresponding drill plate at the position at which it is sought to make a drill-hole, until the stop 151 abuts against the guiding ring 124 if such rings are used or against the surface 132 of the drill plate 13 oriented on the drilling tool side, i.e. on the side opposite the side corresponding to the plate oriented towards the workpiece. This shift can be done by hand by an operator or by means of robotic handling arm (robotic arm) if the drilling device is securely attached to the extremity of such an arm.

Figure 8:
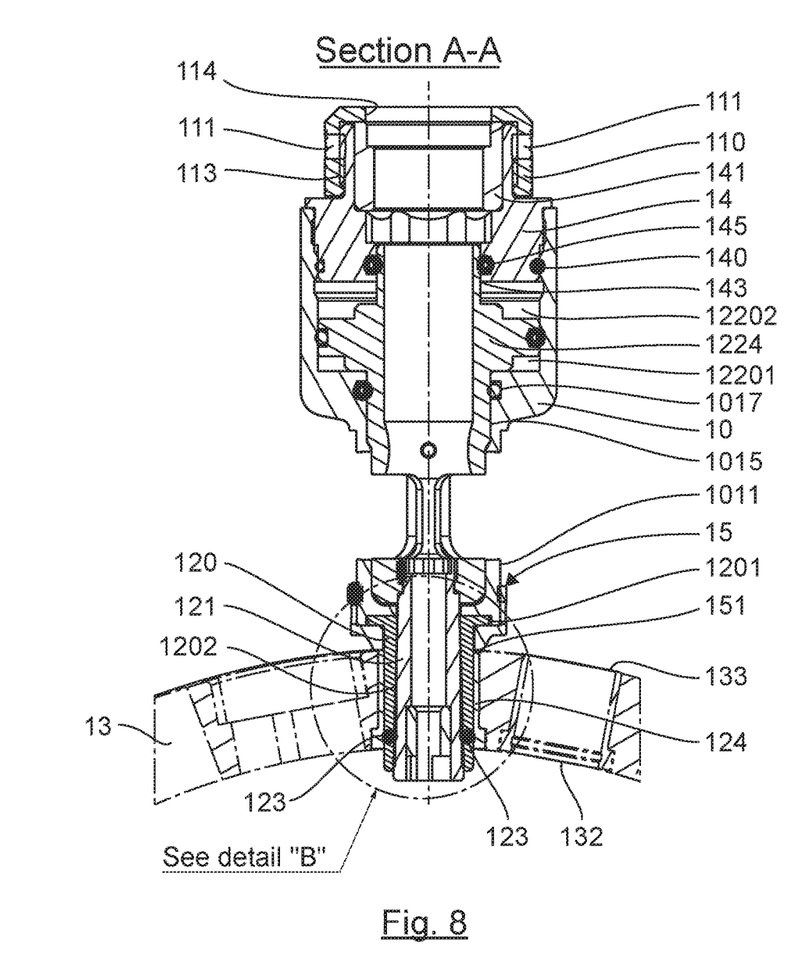
FIG. 8 illustrates a cross-section view of a device according to an exemplary embodiment, cooperating with a drill plate, of which the expansion cone is in a locking position, the locking balls are in a blocking position and the expandable ring is in an expanded position.
Figure 9:
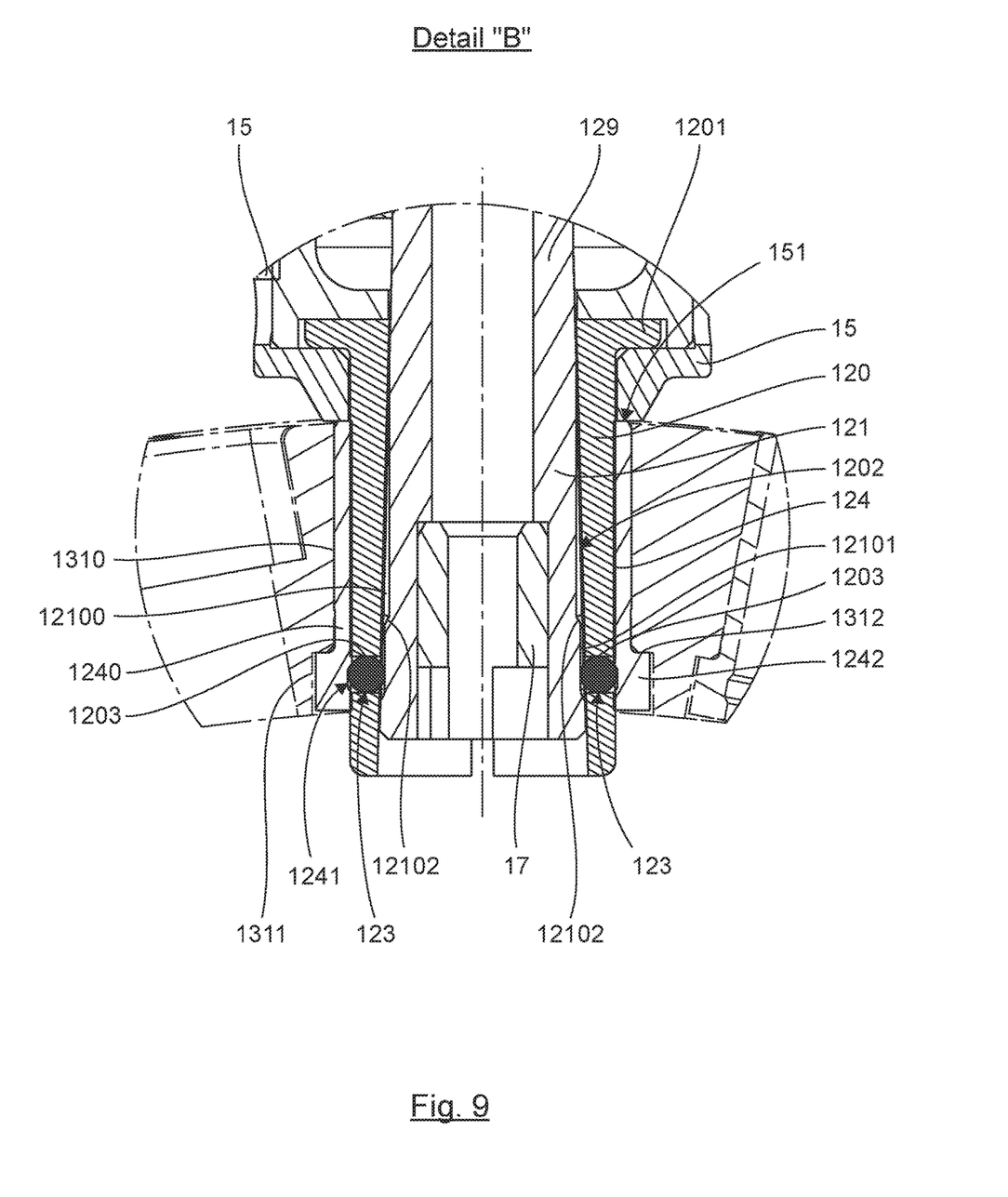
FIG. 9 illustrates a detail from FIG. 8.
Figure 10:
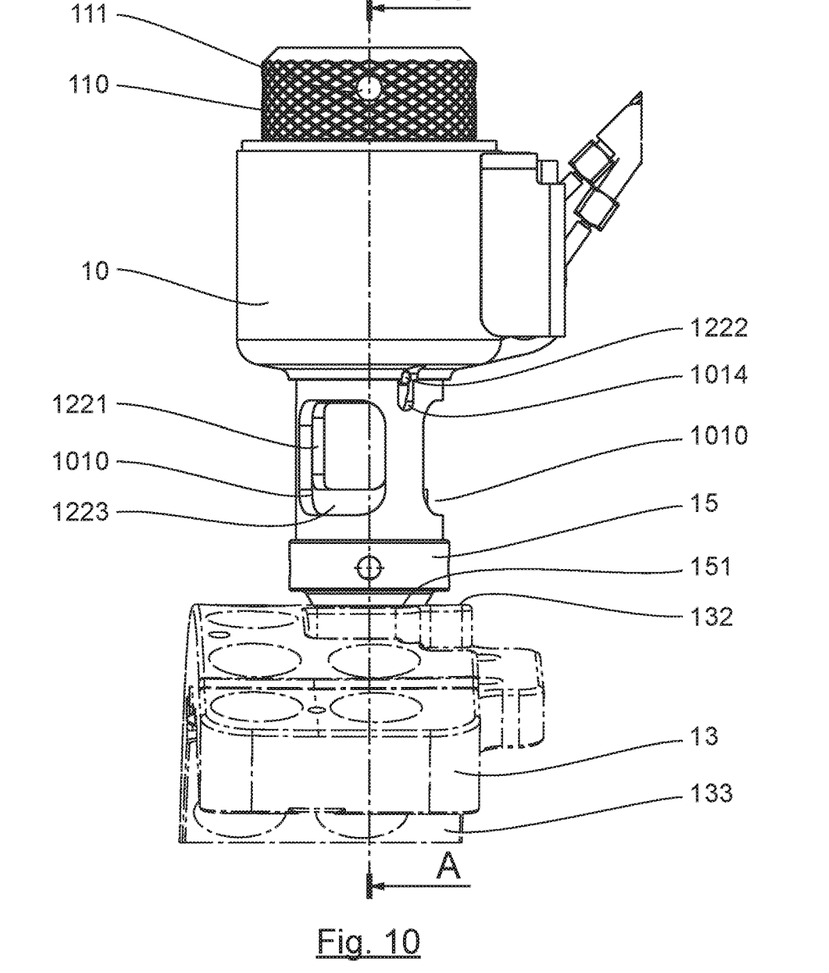
FIG. 10 illustrates a view in partial section of the device of FIG. 8.

Pressurized fluid is then admitted via the locking conduit 1127 in the locking chamber 12201 to place the expansion cone 121 in its locking position, the expandable ring in its expanded state and the locking balls 123 in their blocking state (cf. FIGS. 8 and 9).

Under the effect of the pressure in the locking chamber 12201, the piston 1224 gets translated within the cylinder 1220 along the longitudinal axis of the piston towards the extremity of the device for securely attaching that is to be securely attached to a drilling device (cf. arrow V).

The rod 1223 of the piston follows the shifting in translation of the piston 1224 so much so that the expansion cone 121 gets translated relative to the expandable ring 120 to get placed in its locking position in which its large-diameter extremity is brought closer to the large diameter extremity of the conical bore 1202 of the expandable ring 120. The expansion cone 121 thus acts on the expandable ring 120. The expandable ring 121 is then in its expanded state in which its external diameter is increased until the expandable ring 120 gets compressed against the internal bore 1240 of the corresponding guiding ring 124 or against the internal wall of the positioning bore of the plate if no guiding ring is used.

The device for securely attaching is thus kept securely attached to the drill plate under the effect of friction between the expandable ring and the guiding ring or, as the case may be, the positioning bore.

During the movement of the expansion cone 121 towards its locking position, the locking balls 123 roll on the surface of the expansion cone 121 in their respective grooves 1210 firstly against the first stage 12100 and then against the inclined ramp 12102 to come into contact with the second stage 12101.

During this movement, the locking balls 123 move in translation within radial holes 1203, along their longitudinal axis, until they get placed in their blocking position in which they form protrusions on the surface of the expandable ring 120 so much so that they are introduced into the peripheral internal blocking housing 1241 of the corresponding guiding ring 124 or directly formed in the corresponding positioning bore if no guiding ring is implemented.

The locking balls 123 associated with the internal peripheral blocking housing 1241 ensure a blocking in translation of the device for securely attaching relative to a drill plate, and thus prevent any shift in translation of the drilling device relative to the plate along the drilling axis during a drilling operation.

In addition, the introduction of locking balls 123 into the internal peripheral locking housing 1241 of the guiding ring 124 tends to induce a compression force of the shoulder 1242 of the guiding ring 124 against the shoulder 1312 of the drill plate as well as a compression force of the extremity of the guiding ring 124 against the stop 151.

Thus the possibility of making successive drill-holes with very high repeatability in terms of drilling depth is ensured.

Such a secure attachment does not does not make it necessary to provide the cylinder assembly with very high pressure. A pressure of the order of 6 bars approximately is sufficient.

A drilling operation can then be launched. During such a drilling operation, the pin as well as the cutting tool placed at its extremity get moved in translation and in rotation along the same axis within the drill jig bushing 16.

A chip breaker 17, placed optionally at the extremity of the drill jig bushing 16, breaks the chips formed during drilling and guides them within the drill plate towards the apertures 1221 and 1010 respectively formed in the rod 1223 and in the body 10 so that they can be discharged.

A suction nozzle 18 will have been placed beforehand in secured attachment to the body 10 facing the apertures 1221 and 1010 to suck out the chips and discharge them towards a storage and/or processing zone.

A protection ring 19, traversed by peripheral apertures 190, will have optionally been interposed between the body 10 and the suction nozzle 18 to prevent an operator from being able to put his fingers into the apertures 1221 and 1010.

Once the drilling operation is completed, the unlocking chamber 12202 is again put under pressure with compressed fluid to generate the unlocking of the device according to the procedure described further above.

The intake of compressed fluid into the cylinder assembly is regulated in such a way that the speed of the piston in its shifting towards its locking position is higher than the speed in its shift towards the releasing position. This ensures that the cutting tool has come out of the drill plate before it is possible for the detachment device to get detached from the drill plate. Thus, any breakage of the cutting tool during the detachment of the drilling device is avoided.

The connection of the conduits 1227, 1228 is done preferably downstream to the actuating trigger or the actuating valve used to power the motor of the drilling device when a drilling operation is activated.

In this way, the starting of a drilling operation is synchronized with the locking of the secured-device so as to ensure that the drilling operation starts after the secured detachment of the drilling device or vice versa.

5.3. Variant

Rather than implement balls to block the movement in translation of the device for securely attaching relative to the plate, an expandable flanged bushing could be implemented. This bushing could get housed in a housing of a complementary shape formed directly in a positioning bore or in a guidance ring such as locking balls. As an alternative, this bushing could come to abut against the surface of the side corresponding to the workpiece.

The locking balls and the bushing constitute means of blockage in translation of the device for securely attaching relative to the plate along the drilling axis.

In one variant, the sense of shift of the expansion cone to pass from its releasing position to its locking position could be inverted. In this case, it will pass from its releasing position to its locking position in being translated towards the surface of the drill plate oriented towards the workpiece.

During their passage from their unblocking position to their blocking position, the balls could first of all come into contact with the edge of the peripheral blocking housing oriented towards the drilling device. The balls will thus get housed in the peripheral blocking housing in generating an axial force tending to compress the stop against the plate or the guiding ring.

As an alternative, the balls could get directly housed in the peripheral blocking housing without giving rise to any axial force.

An exemplary embodiment of the present disclosure is aimed especially at providing an efficient solution to at least certain of the different problems described relative to the prior art.

In particular, at least one embodiment provides a device for securely attaching a drilling device to a drill plate that makes it possible to make holes with low geometrical tolerances.

At least one embodiment provides a device for securely attaching such as this that provides high repeatability for the depths of a plurality of drill-holes.

At least one embodiment provides a device for securely attaching that prevents the drilling device from sliding, especially from retreating relative to the drill plate during a drilling operation.

At least one embodiment provides a drilling device such as this that is compact.

At least one embodiment provides a device for securely attaching that requires the deployment of relatively small forces to ensure that a drilling device is held in position efficiently relative to a drill plate during a drilling operation.

At least one embodiment provides a device for securely attaching that is compact and simple to design and/or reliable.

Although the present disclosure has been described with reference to one or more examples, workers skilled in the art will recognize that changes may be made in form and detail without departing from the scope of the disclosure and/or the appended claims.

Figure 13:
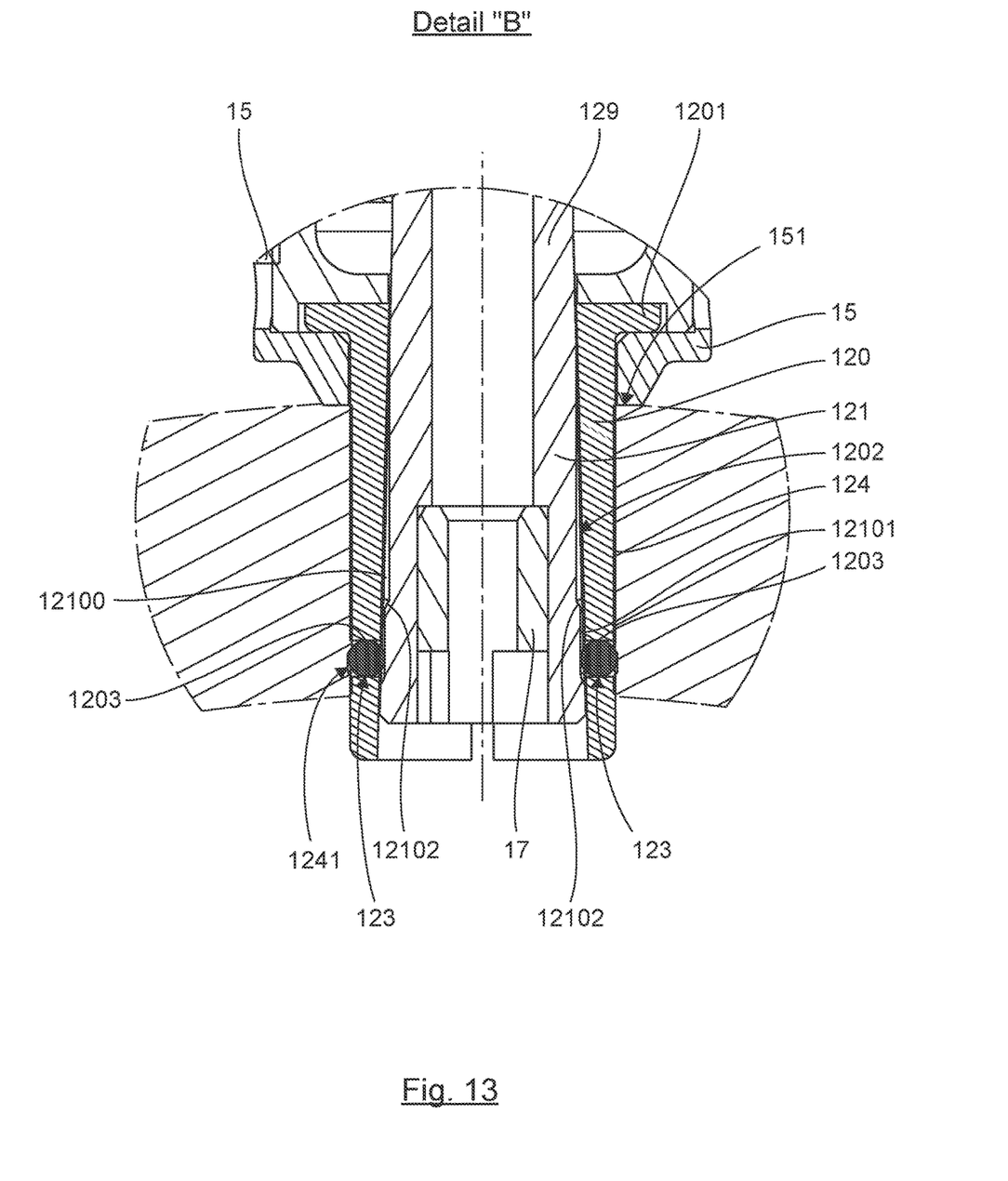
FIG. 13 illustrates a detail from FIG. 8 according to an alternative embodiment.

FIG. 13 illustrates a detail from FIG. 8 according to an alternative embodiment in which said peripheral blocking (1241) housings are made in said plate (13).

The invention claimed is:

1. A device for securely attaching a drilling device to a drill plate traversed by a plurality of positioning bores, said device for securely attaching comprising:
   a body;
   a first attachment to securely attach said body to said drilling device;
   a second attachment to securely attach said body to said drill plate, said second attachment comprising an expandable collet, said expandable collet comprising:
      an expandable ring traversed by a conical bore made along a longitudinal axis of said expandable ring;
      an expansion cone housed within said conical bore of said expandable ring, an external peripheral outline of said expansion cone being complementary to said conical bore,
      a translational drive, which drives in translation said expansion cone within said conical bore along said longitudinal axis between at least:
         a releasing position in which said cone is shifted to a largest-diameter side of said conical bore of said expandable ring so much so that said expandable ring is in a relaxed state in which the expandable ring's external diameter is smaller than a diameter of said positioning bores so that said expandable ring can be inserted therein or extracted therefrom;
         a locking position in which said cone is shifted to a smallest-diameter side of said conical bore of said expandable ring so much so that said expandable ring is in an expanded state in which the expandable ring's external diameter is increased so as to keep said device for securely attaching securely attached to said drill plate by friction of said expandable ring against internal walls of one of said positioning bores;
   wherein said expandable collet furthermore comprises locking balls each housed in a hole made in said expandable ring, said expansion cone acting on said locking balls to place them in:
      an unblocking position, taken when said cone is situated in the cone's releasing position, in which said locking balls do not form protrusion on an external peripheral surface of said expandable ring;
      a blocking position, taken when said cone is situated in the cone's locking position, in which said locking balls form protrusions on the external peripheral surface of said expandable ring so that said locking balls can get housed in a peripheral blocking housing securely attached to said positioning bores.

2. The device according to claim 1 wherein said balls are housed in longitudinal grooves made on the surface of said expansion cone.

3. The device according to claim 2 wherein each of said grooves comprises a first stage and a second stage separated by an inclined ramp, a bottom of said first stage being closer to a longitudinal axis of said expansion cone than a bottom of said second stage, said balls being situated against said first stage in said unblocking position and against said second stage in said blocking position.

4. The device according to claim 3 wherein said grooves are not through grooves.

5. The device according to claim 1, wherein said positioning bores are made in said drill plate.

6. The device according to claim 5, wherein said peripheral blocking housings are made in said drill plate.

7. The device according to claim 1, comprising guidance rings configured to be securely attached to said drill plate and traversed by said positioning bores.

8. The device according to claim 7, wherein each of said guidance rings comprises a shoulder with a shape complementary to a housing made in said positioning bores of said plate.

9. The device according to claim 8 wherein said shoulder is made to a side of said plate that is opposite to a side oriented towards said device for securely attaching.

10. The device according to claim 7, wherein said peripheral blocking housings are made said guidance rings.

11. The device according to claim 7, wherein said body comprises a stop that is configured to abut against a surface of said guidance rings oriented towards said device for securely attaching.

12. The device according to claim 1, wherein said body comprises a stop that is configured to abut against a surface of said drill plate.

13. The device according to claim 1, wherein the passage of said cone from its releasing position to its locking position is done in the direction of a surface of said drill plate oriented towards said device for securely attaching, or vice versa.

14. The device according to claim 1, wherein said translational drive comprises a cylinder assembly, said cylinder assembly comprising a cylinder made within said body and a piston mounted so as to be mobile in translation within said cylinder along the axis of translation of said expansion cone, said expansion cone being securely attached in translation to said piston.

15. The device according to claim 14 wherein said cylinder assembly is a double-action cylinder assembly.

16. The device according to claim 14, wherein said cylinder of said cylinder assembly comprises a locking chamber placed on one side of the piston and configured to be powered to shift said expansion cone into its locking position and a releasing chamber placed on the other side of the piston and configured to be powered to shift said expansion cone into its releasing position, the surface area of a face of the piston situated in said releasing chamber being greater than a surface area of a face of said piston situated in said locking chamber.

17. The device according to claim 1 comprising a regulator, which regulates the translational drive, said regulator being configured so that the speed of shift in translation conveyed to said expansion cone by said translational drive is greater during its passage from said releasing position to said locking position than it is during its passage from said locking position to said releasing position.

18. The device according to claim 1, wherein the device is traversed from one side to the other through by a drill jig bushing.

* * * * *